UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

BLUE DYE.

SPECIFICATION forming part of Letters Patent No. 536,880, dated April 2, 1895.

Application filed November 10, 1894. Serial No. 528,448. (Specimens.)

*To all whom it may concern:*

Be it known that I, RICHARD KIRCHHOFF, of Berlin, in the Kingdom of Prussia, German Empire, have invented new and useful Improvements in the Production of a Blue Dye; and I do hereby declare that the following is a full, clear, and exact description of the invention, which will enable others skilled in the art to which it appertains to make and use the same.

This invention relates to the production of new tetrazo dye which produces on unmordanted cotton fast blue shades.

The new coloring matter is produced by reacting with two molecules of gamma-amidonaphtolmonosulfo acid in weakly acid solution upon one molecule of tetrazotized para-amidobenzene-azo-amido-para-cresolether.

The aforementioned diamido base may be obtained by combining para-nitro-diazobenzene with amido-para-cresolether and reducing the nitro-amido-azo-compound by means of alkali sulfides. The base derived in this way for instance from para-amido-cresolmethylether ($CH_3:OCH_3:NH_2 = 1:4:3$) forms in dry state a yellowish brown powder, easily soluble in alcohol or benzene with a yellow color, melting at 115° centigrade. It is soluble in diluted hydrochloric acid with deep-red color.

The preparation of the new dye derived from this base may be practically carried out in the following manner: Twenty-five and one-half kilograms of para-amidobenzene-azo-amido-para-cresolmethylether or the corresponding quantity of its sulfate or hydrochlorate and sixty kilograms of hydrochloric acid are dissolved in water and diazotized in the well known manner by means of fourteen kilograms of sodium nitrite. The diazo-body, which forms a yellow-brown solution is added to a solution of fifty-three kilograms of the sodium salt of gamma-amidonaphtolmonosulfo acid in presence of an excess of sodium acetate. The coloring matter separates in the shape of a violet-black powder. After stirring for some hours the solution is gently heated and made alkaline and the dye-stuff is precipitated by means of common salt. It dyes unmordanted cotton blue shades, fast to acid, alkali and light.

The coloring matter in dry state is a black brown powder with metallic luster, soluble in cold more readily in hot water, with violet blue color, which is not altered by the addition of caustic soda lye, an excess of the lye producing a black-violet precipitate.

In alcohol or ether the dye is practically insoluble.

From the aqueous solution of the dye the free color-acid is immediately precipitated if mineral acids are added, while on addition of acetic acid the separation is imperfect.

Concentrated sulfuric acid dissolves the coloring matter with blue black color, which on diluting with water turns at first violet, but on further diluting the free color acid separates in the shape of black-violet flakes.

Having now described my invention, what I claim is—

The hereinbefore described dye produced by combining one molecule of para-amidobenzene-azo-amido-para-cresolether with two molecules of gamma-amidonaphtolmonosulfo acid in weakly acid solution said dye possessing the following constitution formula

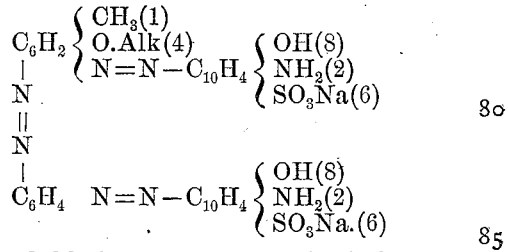

being soluble in cold more readily in hot water with violet blue color, which is not altered by the addition of caustic soda lye, practically insoluble in alcohol and ether, soluble in concentrated sulfuric acid with blue black color, which on diluting with water turns at first violet while on further diluting the free color acid separates in the shape of black violet flakes, said dye producing on unmordanted cotton fast blue shades.

In testimony whereof I hereunto set my hand and affix my seal, in the presence of two witnesses, this 26th day of October, A. D. 1894.

RICHARD KIRCHHOFF. [L. S.]

Witnesses:
RUDOLF VON ROTZENBURG,
GUSTAV LUCHT.